United States Patent
Oshiki et al.

(10) Patent No.: US 6,392,832 B1
(45) Date of Patent: *May 21, 2002

(54) METHOD FOR USING HEAT TO RECORD ON MAGNETIC MEDIUM AND DISK APPARATUS HAVING TEMPERATURE CHANGING DEVICE

(75) Inventors: Mitsumasa Oshiki; Seiya Ogawa, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,646

(22) Filed: Mar. 25, 1998

(30) Foreign Application Priority Data

Mar. 26, 1997 (JP) ................................. 9-074277

(51) Int. Cl.⁷ .................................................. G11B 5/02
(52) U.S. Cl. ................................... 360/59; 369/13
(58) Field of Search .......................... 360/59, 113, 114, 360/313; 369/13

(56) References Cited

U.S. PATENT DOCUMENTS

| | | | |
|---|---|---|---|
| 5,808,973 A | * 9/1998 | Tanaka | 369/14 |
| 5,889,641 A | * 3/1999 | Belser et al. | 360/113 |
| 5,930,434 A | * 7/1999 | Mowry et al. | 385/124 |
| 5,959,943 A | * 9/1999 | Yonezawa et al. | 360/59 |
| 5,963,532 A | * 10/1999 | Hajjar | 369/112 |
| 6,018,505 A | * 1/2000 | Miyatake et al. | 369/13 |
| 6,027,825 A | * 2/2000 | Shiratori et al. | 428/694 |

* cited by examiner

Primary Examiner—Regina Y. Neal
(74) Attorney, Agent, or Firm—Greer, Burns & Crain, Ltd.

(57) ABSTRACT

A magnetic recording method using a magnetic head to record information in an information recording medium and read the information recorded on the information recording medium is such that the temperature of a portion of the information recording medium on or from which information is recorded or read is changed in order to record or read information. A disk device having the ability to record and read information comprises a magnetic head for recording information by applying a given magnetic field to an information recording medium and reading the information from the information recording medium; and a temperature changing mechanism for changing the temperature of a portion of the information recording medium on or from which information is recorded or read. The magnetic head is moved to the portion of the medium in which a temperature change is produced by the temperature changing mechanism, whereby information is recorded or read.

15 Claims, 12 Drawing Sheets

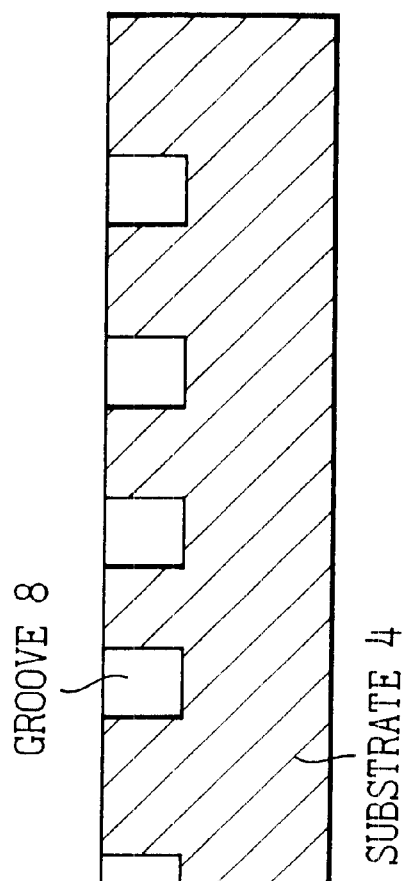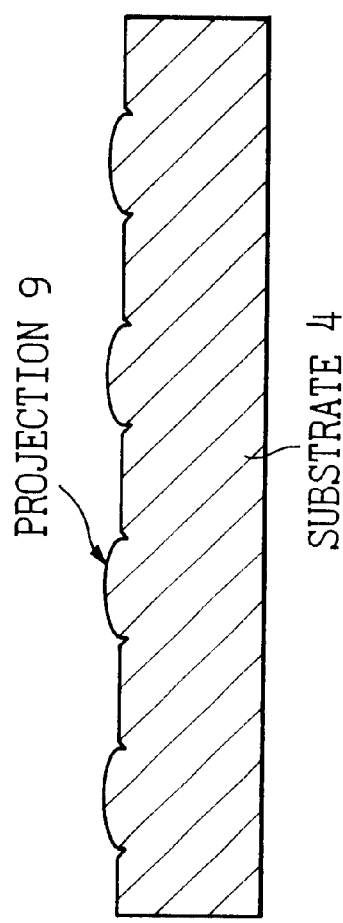

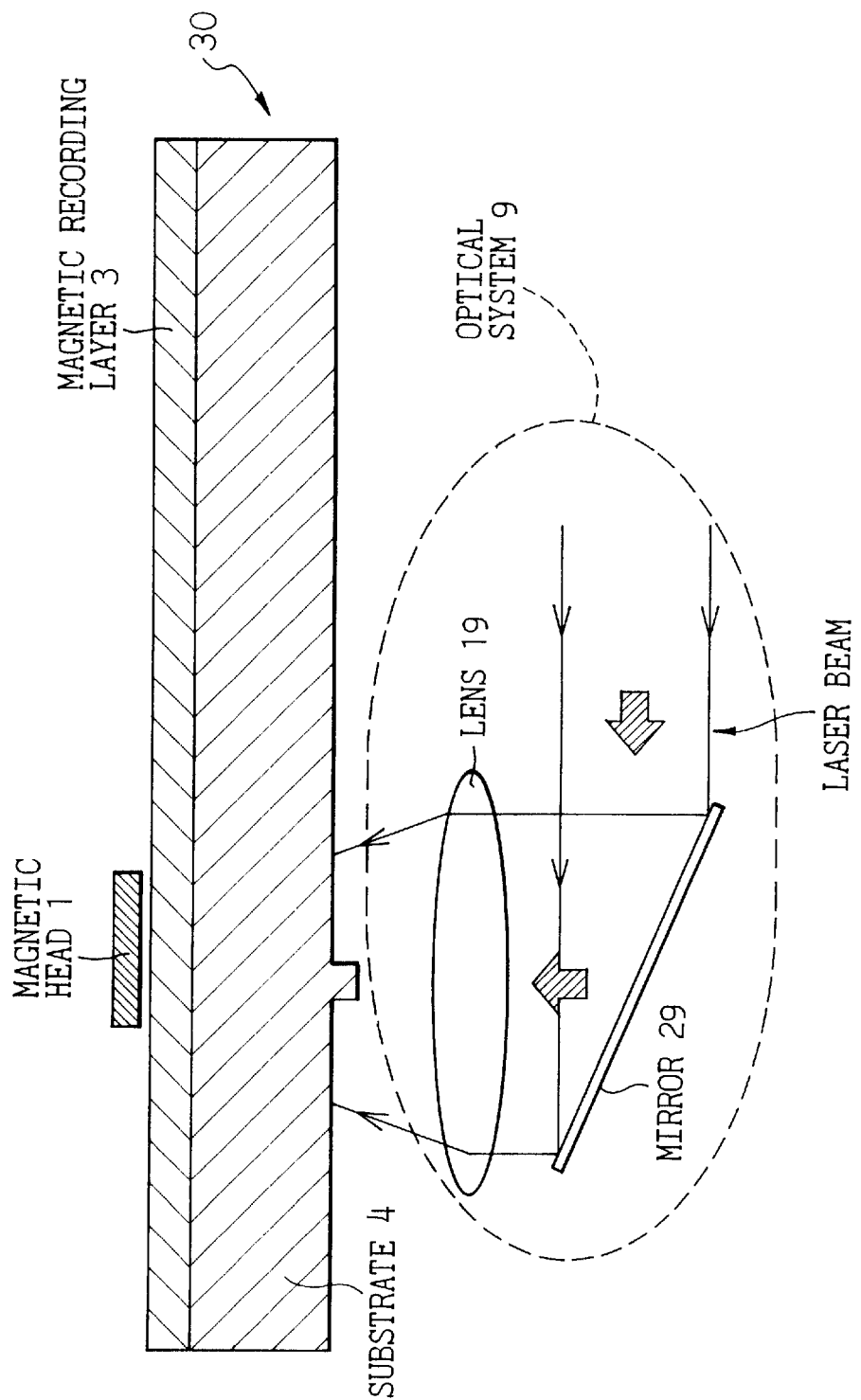

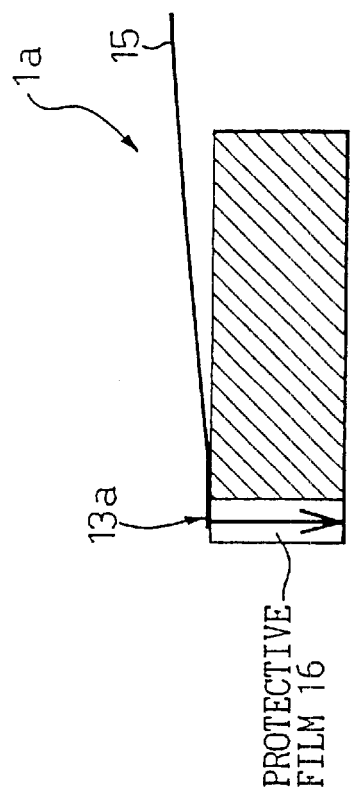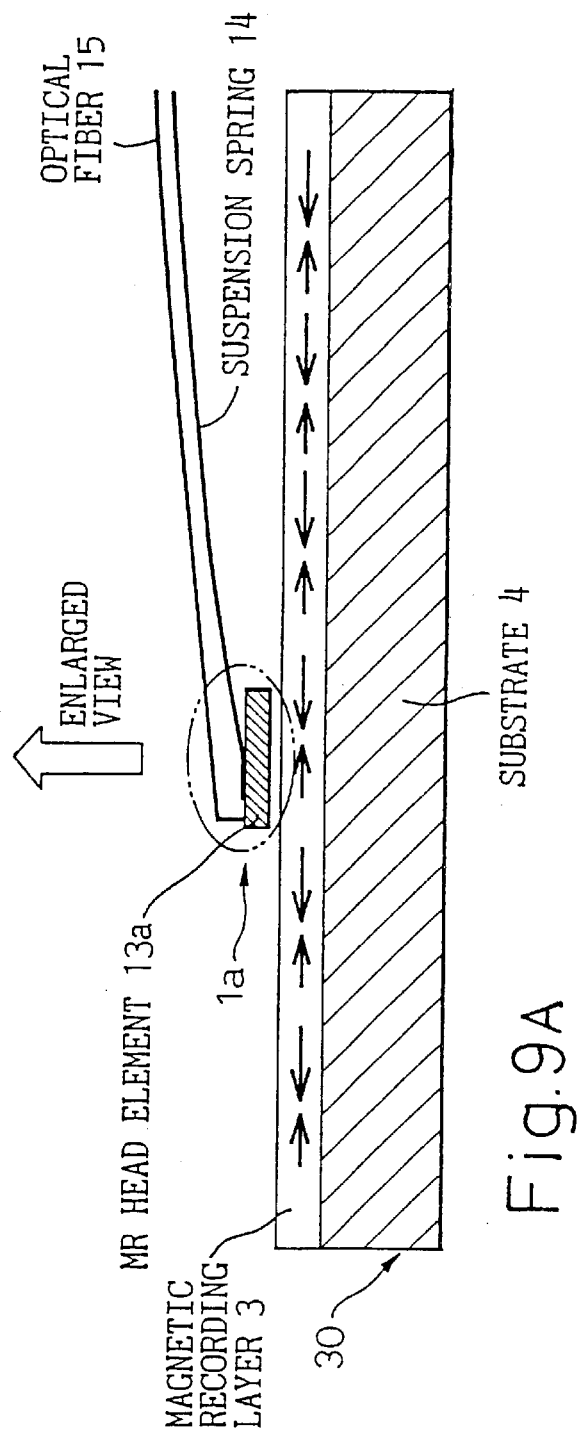

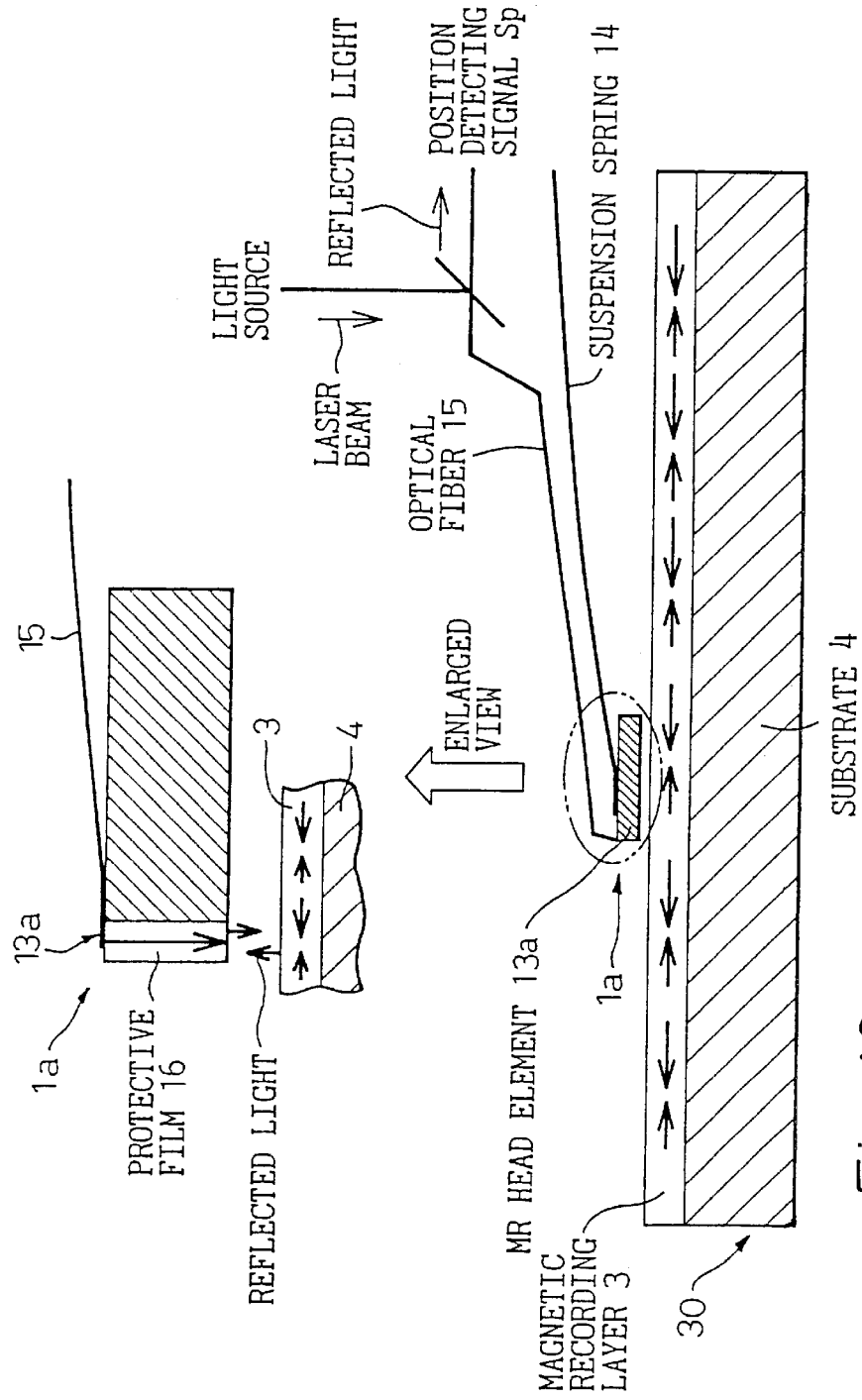

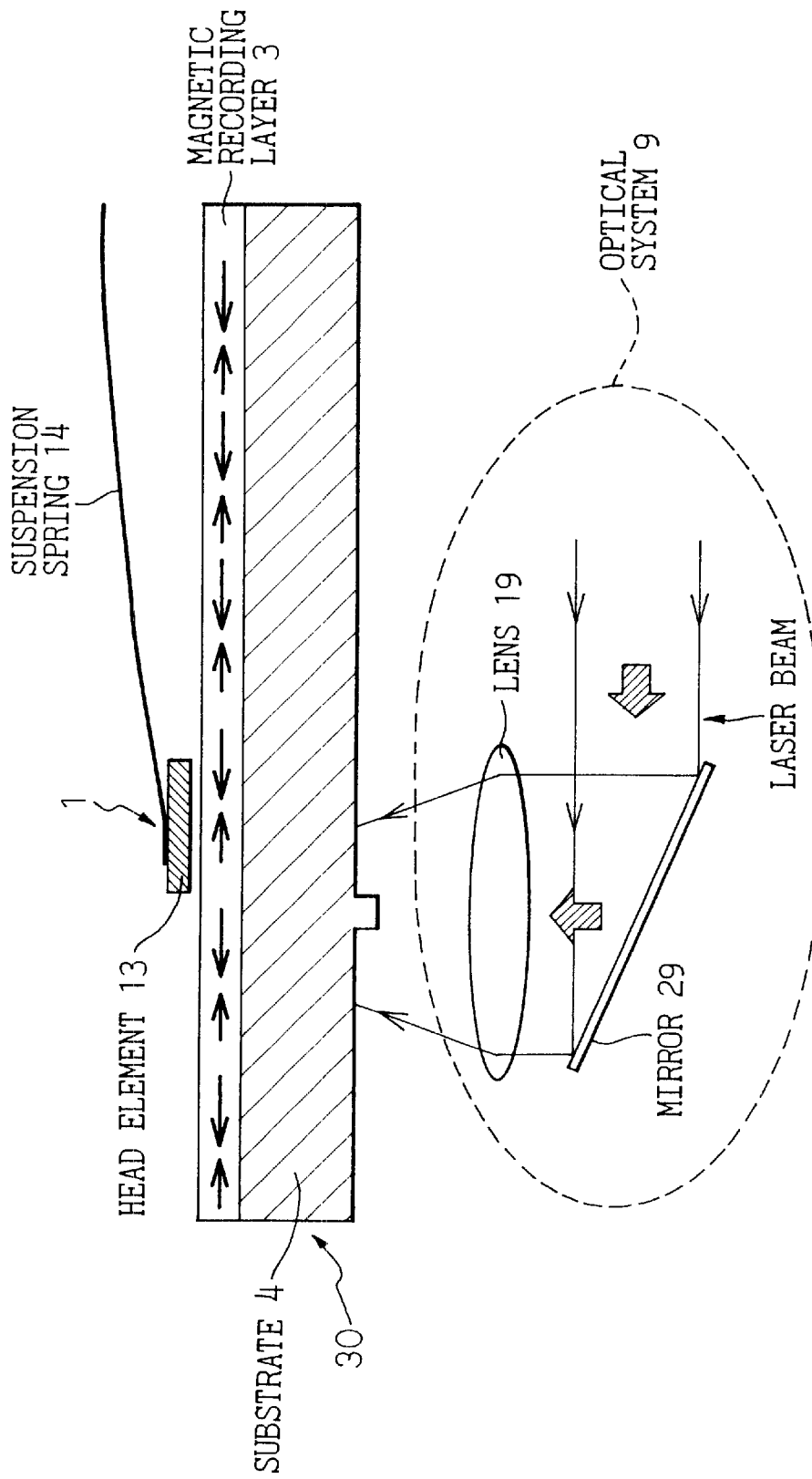

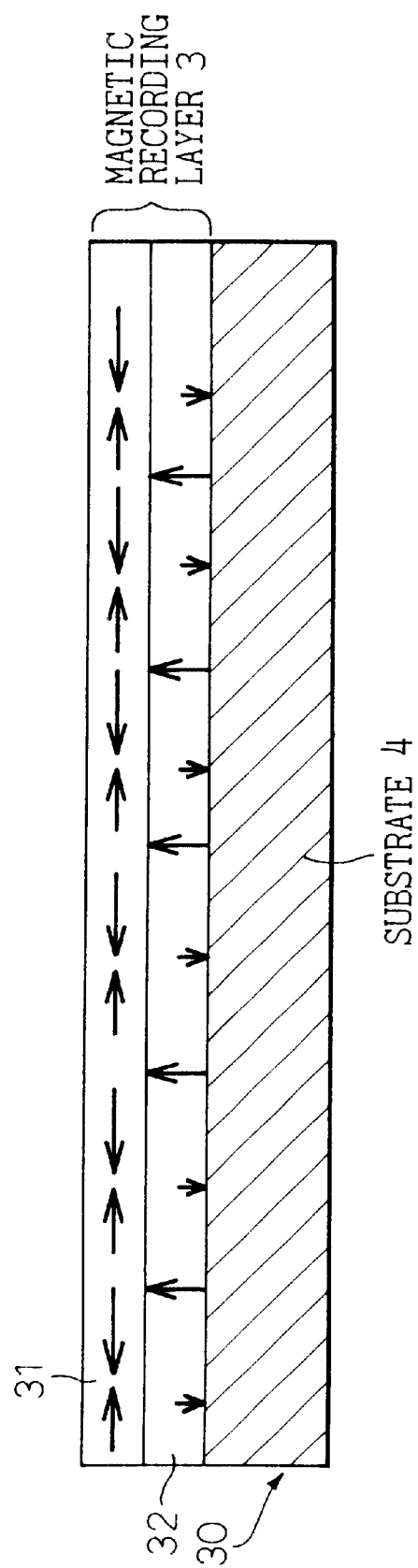

METHOD FOR USING HEAT TO RECORD ON MAGNETIC MEDIUM AND DISK APPARATUS HAVING TEMPERATURE CHANGING DEVICE

BACKGROUND OF THE INVENTION

1. Field of the Invention

The present invention relates to a magnetic recording method for recording information by utilizing a change in magnetization, and to a disk device, adopting the magnetic recording method, used as an information storage device for a computer.

2. Description of the Related Art

The role of information storage devices played by disk devices including hard magnetic disk devices and optical disk devices is getting more and more important. There is a strong demand for high-performance disk devices.

In particular, it is most important to record information at a high density on a magnetic recording medium and read it from the magnetic recording medium. A magnetic film suitable for high-density recording and used to coat a recording medium is formed using a technique such as sputtering, and is provided in the form of a polymer of minute magnetic particles.

With the demand for higher-density information recording, finer magnetic particles are being used. Presumably, when the diameter of a magnetic particle is on the order of approximately 10 nm (currently, approximately 30 nm; 1 nm=$10^{-9}$ m), a state in which information can be stably recorded becomes difficult to maintain because of the influence of thermal agitation. For maintaining a stable information-recorded state, a magnetic material for recording, to which a large coercive force (Hc), that is 4 to 5000 Oe or two to three times higher than a coercive force applied to a conventionally employed magnetic material, must be applied, must be adopted for producing a magnetic film for a medium.

Using such a medium, the magnetic field required for recording information becomes very large (two to three times higher than Hc). A magnetic head formed with a normal magnetic material would have difficulty in recording information on the medium.

However, as far as a recording medium requiring a large coercive force (Hc) is concerned, a technique for recording information has not been devised. It is therefore uncertain whether or not a medium with a high recording density can be put to practical use.

SUMMARY OF THE INVENTION

The present invention attempts to solve the foregoing problems. An object of the present invention is to provide a magnetic recording method capable of recording information on a stable basis even when a magnetic material for recording to which a relatively large coercive force must be applied is used to record information, and to provide a disk device suitable for high-density magnetic recording by utilizing the magnetic recording method.

For solving the problems, according to the present invention, there is provided a magnetic recording method in which, when a magnetic head is used to record information on an information recording medium or read the information recorded on the information recording medium, the temperature of a portion of the information recording medium on or from which information is recorded or read is changed in order to record or read information.

Preferably, a recording medium having projections or grooves, which provide position information used to position a recording head of the magnetic head designed for recording information or a reading head thereof designed for reading information and formed therein in advance, is used as the information recording medium.

More preferably, the information recording medium is heated locally by laser light.

More preferably, a transparent or translucent magnetic material is used to produce the information recording medium.

More preferably, the magnetic material is formed with a laminate film having two or more layers.

More preferably, a material that is transparent relative to the wavelengths of laser light is used to produce a substrate for the information recording medium.

According to the present invention, there is provided a disk device comprising: an information recording medium on which information is recorded according to a change in magnetic field and then preserved; a magnetic head for recording information by applying a given magnetic field to the information recording medium, and reading the information recorded on the information recording medium; and a temperature changing mechanism for changing the temperature of a portion of the information recording medium on or from which information is recorded or read. The magnetic head is moved to the portion of the medium, in which a temperature change is produced by the temperature changing mechanism, in order to record or read information.

Preferably, according to the present invention, there is provided a disk device in which a recording medium having projections or grooves, which provide position information used to position a recording head of the magnetic read designed for recording information or a reading head thereof designed for reading information and formed therein in advance, is used as the information medium.

More preferably, according to the present invention, there is provided a disk device in which the temperature changing mechanism comprises an optical system including a laser. Laser light emanating from the laser is used to locally heat the information recording medium.

More preferably, according to the present invention, there is provided a disk device in which a transparent or translucent magnetic material is used to produce the information recording medium.

More preferably, according to the present invention, there is provided a disk device in which the magnetic material is formed with a laminate film having two or more layers.

More preferably, according to the present invention, there is provided a disk device in which a material that is transparent relative to the wavelengths of laser light is used to produce a substrate for the information recording medium.

More preferably, according to the present invention, there is provided a disk device in which at least one of the recording head of the magnetic head designed for recording information and the reading head thereof designed for reading information is moved while being interlocked with the temperature changing mechanism.

In detail, according to the present invention, there are provided a magnetic recording method and disk device in which a laser or the like is used to irradiate light for heating, and to thus reduce a coercive force (Hc), which must be applied to a magnetic film used to produce a high-density recording medium, to a the level permitting reliable recording. In general, when a magnetic substance is heated, a coercive force Hc that must be applied to the magnetic substance for recording tends to decrease. When the magnetic substance is heated to the Curie temperature, the coercive force Hc becomes zero (Hc=0). The limit temperature of CoCrPt used for normal magnetic recording is on the order of approximately 500° K.

A recording head moves according to a position to which laser light is irradiated, whereby a heated area becomes coincident with a recorded area to which a magnetic field is applied. During reading, since the temperature of a magnetic substance is equal to the room temperature, the magnetic substance is free from thermal agitation. A stable information-recorded state can therefore be attained.

According to the present invention, there is provided an information recording method and disk device suitable for high-density recording and capable of preserving recording information on a stable basis. Furthermore, there is provided an information recording method and disk device capable of providing servo information suitable for high-density recording.

BRIEF DESCRIPTION OF THE DRAWINGS

The above object and the features of the present invention will be more apparent from the following description of the preferred embodiments with reference to the accompanying drawings, wherein:

FIGS. 3a and 3b are sectional views showing the second embodiment of the present invention;

FIG. 4 is a sectional view showing the third embodiment of the present invention;

FIG. 9 is a sectional view showing the second applied example of a magnetic disk device;

FIG. 10 is a sectional view showing the third applied example of a magnetic disk device;

FIG. 11 is a sectional view showing the fourth applied example of a magnetic disk device; and FIG. 12 is a sectional view showing the fifth applied example of a magnetic disk device.

DESCRIPTION OF THE PREFERRED EMBODIMENTS

Hereinafter, detailed descriptions of the preferred embodiments of the present invention will be given with reference to FIGS. 1 to 12.

Figure 1:
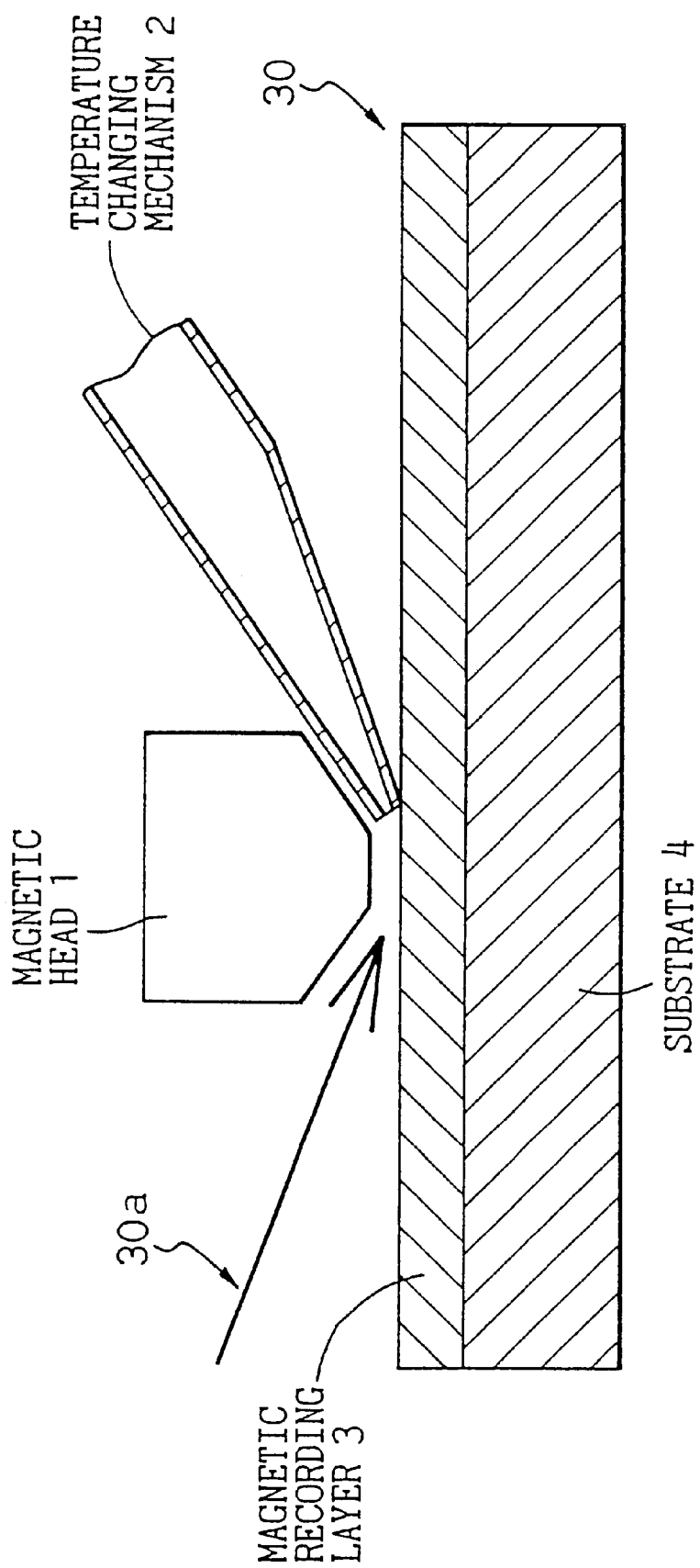
FIG. 1 is a sectional view showing the first embodiment of the present invention.
Figure 2:
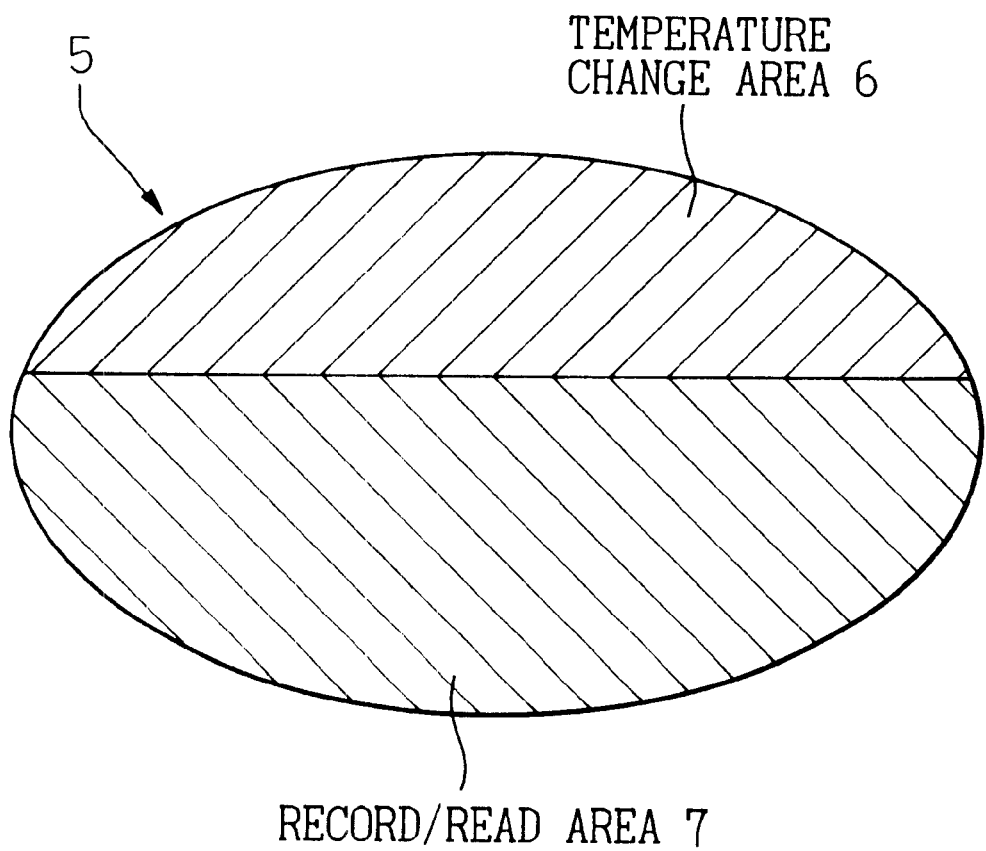
FIG. 2 is an enlarged view showing a model of the surface of a magnetic recording medium.

FIG. 1 is a sectional view showing the first embodiment of the present invention; and FIG. 2 is an enlarged view showing a model of the surface of a magnetic recording medium.

The first embodiment of the present invention will be described with reference to FIG. 1. FIG. 1 shows a diagram conceptually showing the whole of a magnetic disk device adopting a magnetic recording method of this embodiment.

A magnetic disk device in accordance with the present invention consists broadly of three elements; a magnetic head 1, a magnetic recording medium 30, and a temperature changing mechanism 2 for changing a local temperature. The magnetic head 1 records or reproduces information on or from the magnetic recording medium 30. The magnetic recording medium 30 consists of a magnetic recording layer 3 on which information is recorded and preserved in the form of magnetic fields applied by the magnetic head 1, and a substrate 4 on which the magnetic recording layer is formed. The temperature changing mechanism 2 of the embodiment shown in FIG. 1 is realized by a technique of heating the magnetic recording medium by converging heat rays such as laser light or a hot gas or a technique of blasting (i.e., blowing) a cooling gas. Using these components, the magnetic disk device in accordance with the present invention heats or cools a portion 30a of the magnetic recording medium 30, so as to record or reproduce information on or from the portion, using the magnetic head.

FIG. 2 shows a conceptual view showing a recording area on the surface 5 of the magnetic recording medium including the magnetic recording layer 3. In the first embodiment of the present invention, a portion (temperature change area 6 in FIG. 2) of the surface 5 of the recording medium is heated or cooled in order to record or read information on or from another portion (record/read area 7 in FIG. 2) of the surface of the recording medium using the magnetic head 1. In general, when the temperature of a magnetic material rises, a coercive force (Hc) that must be applied to the magnetic material tends to decrease. Heating is therefore an effective means.

FIGS. 3a and 3b are diagrams showing the second embodiment of the present invention. FIG. 3a shows an example of the substrate 4 having grooves formed in advance; and FIG. 3b shows an example of the substrate 4 having projections formed in advance. Hereinafter, components identical to the aforesaid ones will bear the same reference numerals.

As shown in FIGS. 3a and 3b, in the first embodiment shown in FIG. 1, the substrate 4 having grooves 8 or projections 9 formed in advance is used. Since such a substrate is used, a recording head of a magnetic head designed for recording information or a reading head thereof designed for reading information can be easily positioned to an area in a medium on or from which information is recorded or read.

Figure 5:
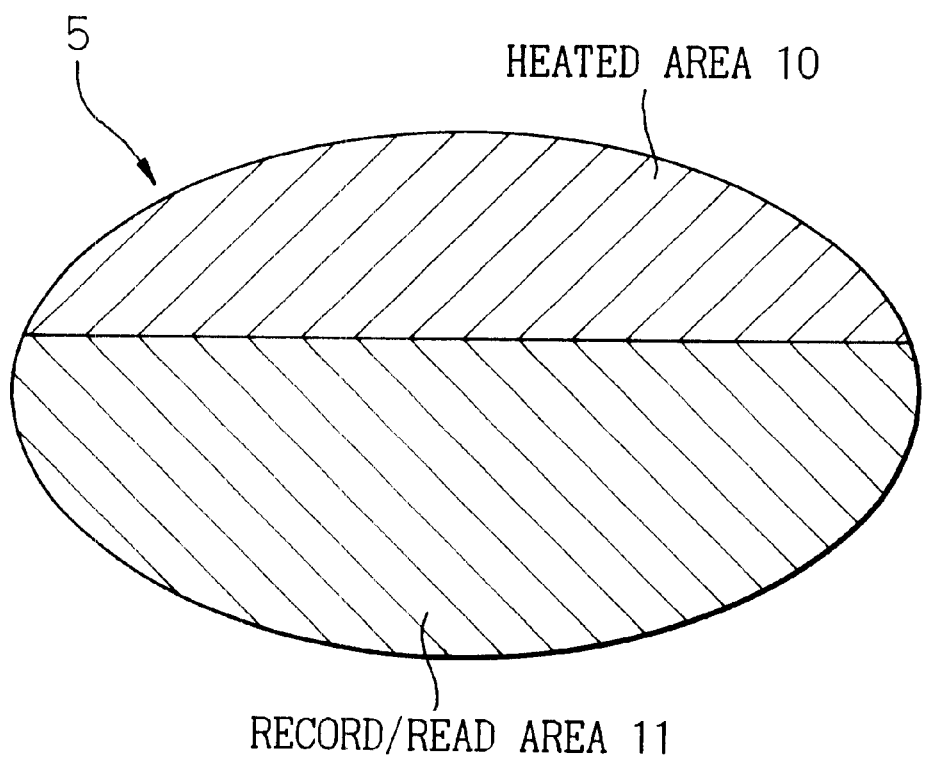
FIG. 5 is an enlarged view showing a model of the surface of a recording medium.

FIG. 4 is a sectional view showing the third embodiment of the present invention; and FIG. 5 is an enlarged view showing a model of the surface of a recording medium.

FIGS. 4 and 5 show conceptual views of the third embodiment.

FIG. 4 conceptually shows the overall configuration of the third embodiment of a magnetic disk device adopting a magnetic recording method of this embodiment. The magnetic disk device in accordance with the present invention consists broadly of three elements; a magnetic head 1, a magnetic recording medium 30, and a heating means serving as a temperature changing mechanism. The magnetic head 1 records or reproduces information on or from the magnetic recording medium 30. The magnetic recording medium 30 consists of a magnetic recording layer 3 in which information is preserved in the form of magnetic fields applied by the magnetic head 1, and a substrate 4 having the magnetic recording layer formed thereon. In this embodiment, an optical system 9 including a mirror 29 and lens 19 for converging laser light L and thus heating the magnetic recording layer 3 is adopted as an example of the heating means. Other examples of the heating means include a heater and a means for locally heating the medium using electromagnetic radiation such as microwaves. Owing to these components, according to the present invention, a portion of the surface 5 of the recording medium (heated area 10 in FIG. 5) is heated, and information is recorded or reproduced on or from another portion (record/read area 11 in FIG. 5) of the surface of the recording medium using the magnetic head 1.

Figure 6:
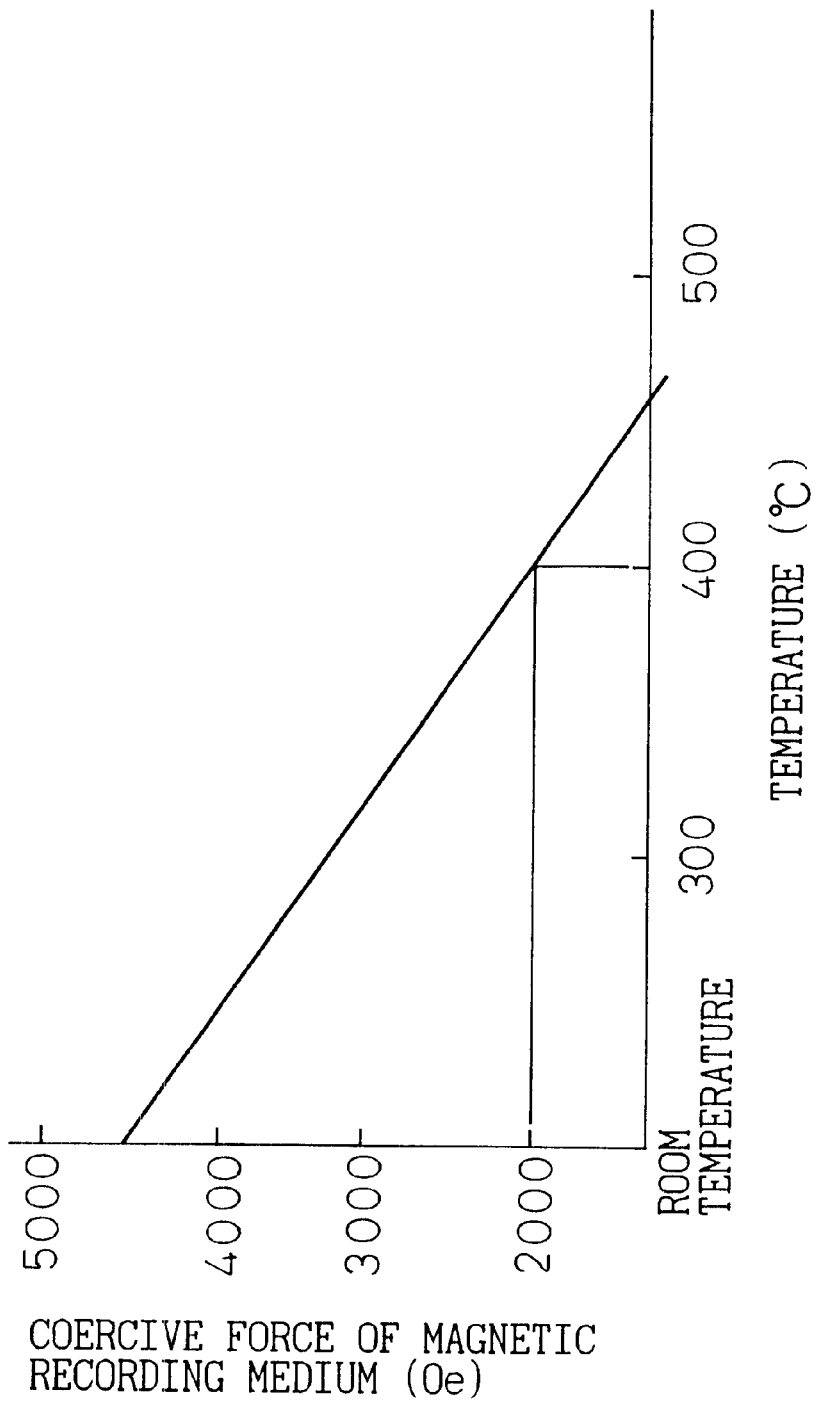
FIG. 6 is a graph showing a change in coercive force (Hc), which must be applied to a magnetic recording medium, relative to temperature.

FIG. 5 is a conceptual view showing the surface of a recording medium. In the third embodiment of the present invention, for example, laser light is converged to heat a portion (heated area 10 in FIG. 5) of the surface 5 of the medium, and information is recorded or read in or from another portion (record/read area 11 in FIG. 5) of the surface 5 of the recording medium using the magnetic head 1. In general, the Curie temperatures of magnetic substances range from 400° C. to 500° C. The Curie temperature of a recording medium employed herein is approximately 450° C. FIG. 6 shows a change in coercive force (Hc), which must be applied to the magnetic recording medium, relative to temperature. The temperature to which the medium is heated is determined by the relationship between a change in magnetization of a magnetic film, which is used to realize the magnetic recording layer, relative to temperature, and a magnetic field required for recording and applied by the magnetic head. In FIG. 6, at a temperature of 400° C., the coercive force (Hc) that must be applied to the recording layer becomes equal to a proper magnetic field (2000 Oe) required for recording. A record is preserved in the magnetic recording layer when the temperature of the magnetic recording medium becomes equal to the room temperature. At this time, the coercive force (Hc) that must be applied to the magnetic recording medium is as high as 4500 Oe. An information-recorded state can be maintained on a stable basis while being unaffected by thermal agitation.

Other Embodiments

When the magnetic recording medium of the first embodiment is made of a transparent or translucent magnetic material, a technique of heating the medium from the surface thereof opposite to the magnetic head can be adopted. This is advantageous in terms of mounting a disk device. The term "transparent" means that the magnetic material can optically and electromagnetically transmit light or electromagnetic radiation. When the magnetic film forming the magnetic recording layer is multilayered, thin films exhibiting different temperature changes or different changes in coercive force can be used in combination. In this case, the advantage of the present invention can be exerted more greatly. Furthermore, when at least one of the recording head of the magnetic head designed for recording information and the reading head thereof designed for reading information, and the temperature changing mechanism for producing a temperature change are moved in a mutually interlocked manner all the time while keeping the positional relationship shown in FIG. 3 between them, the advantage of the present invention is increased.

Overall Configuration of a Magnetic Disk Device

A magnetic disk device comprises a magnetic disk medium (magnetic recording medium), a magnetic head, a head control unit, and an electronic circuit unit. The magnetic disk device records or reproduces information on or from the magnetic recording medium using the magnetic head. The head control unit has a feature for giving a control so as to move the magnetic head to a given position on the medium. The electronic circuit unit converts an electric signal to be recorded or reproduced (read) into an information signal. With regard to the magnetic head and magnetic recording medium having a close relation to the present invention, normally, several magnetic recording media are stacked, and one magnetic head is associated with each of both surfaces of each of the magnetic recording media. The magnetic head is moved over the whole surface of an associated magnetic recording medium by means of a head mechanism, whereby information is recorded or reproduced.

Figure 7:
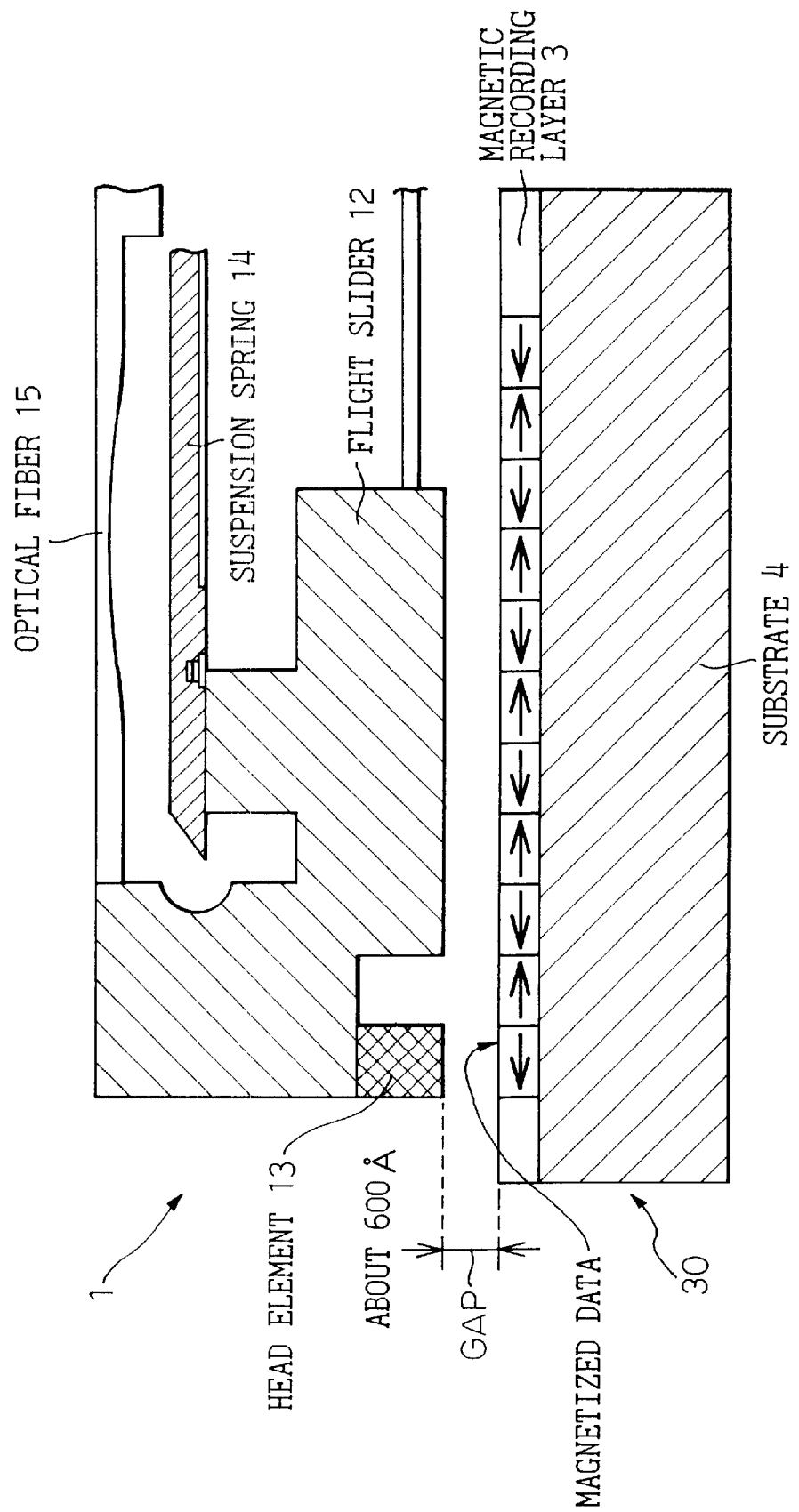
FIG. 7 is an enlarged sectional view showing the major portions of a magnetic head and a magnetic recording medium.

FIG. 7 shows a model in which information is recorded or reproduced on or from a magnetic recording medium using a magnetic head. Between the magnetic head 1 and magnetic recording medium 30, a minute space of approximately 600 angstroms wide is retained owing to a flight slider 12 utilizing an air flow whose flow rate is proportional to the number of rotations made by the recording medium (7,600 rpm). Recording information is achieved by supplying a given magnetic field from a head element 13 attached to the distal end of the flight slider 12 supported by a suspension spring 14 to the magnetic recording medium 30. In this case, information is recorded in the form of magnetizations, indicated by arrows in FIG. 7, in the magnetic recording layer 3 formed on the magnetic recording medium. The thus recorded magnetizations are read as an electric signal by the head element 13, and transmitted to the electronic circuit unit (not shown) through an optical fiber 15.

Figure 8:
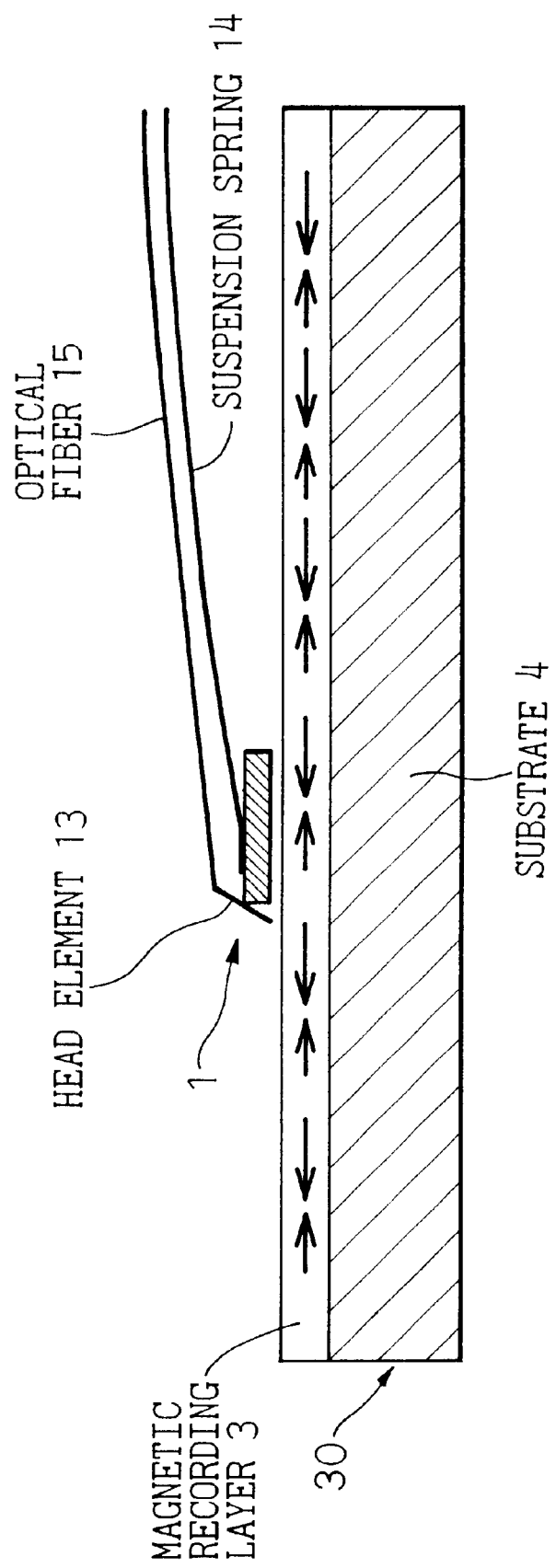
FIG. 8 is a sectional view showing the first applied example of a magnetic disk device.

Applied Examples of a Magnetic Disk Device in which the Present Invention is Implemented (1) FIG. 8 shows the first applied example of a magnetic disk device in which the present invention is implemented. FIG. 8 shows a structure in which the thin optical fiber 15 is laid down over the side surfaces of the suspension spring 14 and floating head 13. The optical fiber 15 guides laser light, whereby a recording area of the magnetic recording layer 3 is heated according to the graph indicating a change in coercive force relative to temperature. When a microscopic pipe is substituted for the optical fiber 15 in order to introduce a cooling gas, a low-temperature area can be formed locally.

(2) FIG. 9 is a sectional view showing the second applied example of a magnetic disk device in which the present invention is implemented. A magnetic head employed in a magnetic disk device is normally a magneto-resistance effect (MR) head that uses a magneto-resistance effect element to read information. An MR head element 13a forming the major portion of the MR head is manufactured using a thin film technology. A transparent and hard material such as a material of approximately 30 micrometers (1 micrometer=$10^{-6}$ m) produced by sputtering aluminum is used to produce the MR head (protective film of element 13a). This material covers the circumference of the MR head. By introducing laser light to the protective film, a heating effect similar to the one indicated by the graph of a change in coercive force relative to temperature shown in FIG. 6 can be produced.

(3) FIG. 10 is a sectional view showing the third applied example of a magnetic disk device in which the present invention is implemented. Light reflected from the surface of the recording medium to which laser light is introduced over the optical fiber as described in conjunction with items (1) and (2) is received, and position information already recorded together with the information of magnetizations in the magnetic recording layer 3 on the surface of the recording medium is detected. Thus, information required for positioning the magnetic head, such as the MR head 1a, is obtained as a position detection signal Sp to be supplied to the head control unit. Based on the positioning information, the magnetic head is moved to a desired position in the magnetic recording layer 3 on the recording medium 30.

(4) FIG. 11 is a sectional view showing the fourth applied example of a magnetic disk device in which the present invention is implemented. When an optically and electromagnetically transparent or translucent substrate is used as the substrate 4 of the magnetic recording medium 30, the optical system 9 can be situated on the surface of the magnetic recording medium opposite to the magnetic head. In other words, the magnetic head and temperature changing mechanism (optical system 9) are placed in pairs with the recording medium 30 between them. The present invention is thus implemented.

(5) FIG. 12 is a sectional view showing the fifth applied example of a magnetic disk device in which the present invention is implemented.

In the fifth applied example shown in FIG. 12, the magnetic film forming the magnetic recording layer of the magnetic recording medium is two-layered. For example, a first magnetic layer 31 containing information on longitudinal magnetizations is formed as a first lower layer of the magnetic recording layer 3, and a second magnetic layer 32 containing information on perpendicular magnetizations is formed as a second upper layer. By adopting this structure, freedom in designing the recording layer 3 is expanded. A change in temperature can be set easily. Furthermore, the recorded states of the first and second magnetic layers can be stabilized.

What is claimed is:

1. A magnetic recording method for a disk device comprising the steps of:
    changing the temperature of an area near a selected position of an information recording medium, by heating said area near said selected position by laser light, on which information is to be recorded to reduce a coercive force of said area near said selected position to a level which permits recording of said information on said selected position; and
    using a magnetic head to magnetically record said information on said selected position of said information recording medium and to magnetically read the information recorded on said information recording medium.

2. A magnetic recording method according to claim 1, wherein a recording medium, having projections or grooves which provide position information used to position a recording head of said magnetic head designed for recording information or a reading head thereof designed for reading information and formed therein in advance, is used as said information recording medium.

3. A magnetic recording method according to claim 1, wherein a transparent or translucent magnetic material is used to produce said information recording medium.

4. A magnetic recording method according to claim 3, wherein said magnetic material is formed with a laminate film having two or more layers.

5. A magnetic recording method according to claim 4, wherein a material that is transparent relative to the wavelengths of laser light is used to produce a substrate for said information recording medium.

6. A magnetic recording method according to claim 3, wherein a material that is transparent relative to the wavelengths of laser light is used to produce a substrate for said information recording medium.

7. A disk device, comprising:
    an information recording medium on which information is recorded according to a change in magnetic field and then preserved;
    a magnetic head for magnetically recording information by applying a given magnetic field to said information recording medium and magnetically reading the information recorded on said information recording medium;
    a head control unit for controlling movement of said head to a given position on said information recording medium; and
    a temperature changing mechanism for changing a temperate of an area near said given position of said information recording medium, by heating said area near said selected position by laser light, on or from which information is recorded or read, wherein said magnetic head is moved to said given position of said medium, near which said temperature change is produced by said temperature changing mechanism, in order to record information by reducing a coercive force of said area near said given position to a level which permits recording of said information.

8. A disk device according to claim 7, wherein a recording medium, having projections or grooves which provide position information used to position a recording head of said magnetic head designed for recording information or a reading head thereof designed for reading information and formed therein in advance, is used as said information medium.

9. A disk device according to claim 8, wherein at least one of said recording head and reading head is moved while being interlocked with said temperature changing mechanism.

10. A disk device according to claim 7, wherein said temperature changing mechanism is an optical system including a laser, and said laser light emanating from said laser is used to heat said area near said given position.

11. A disk device according to claim 7, wherein a transparent or translucent magnetic material is used to produce said information recording medium.

12. A disk device according to claim 11, wherein said magnetic material is formed with a laminate film having two or more layers.

13. A disk device according to claim 12, wherein a material that is transparent relative to the wavelengths of laser light is used to produce a substrate for said information recording medium.

14. A disk device according to claim 11, wherein a material that is transparent relative to the wavelengths of laser light is used to produce a substrate for said information recording medium.

15. A disk device according to claim 7, wherein at least one of a recording head of said magnetic head designed for recording information and a reading head thereof designed for reading information is moved while being interlocked with said temperature changing mechanism.

* * * * *

UNITED STATES PATENT AND TRADEMARK OFFICE
CERTIFICATE OF CORRECTION

PATENT NO.    : 6,392,832 B1
DATED         : May 21, 2002
INVENTOR(S)   : Oshiki et al.

It is certified that error appears in the above-identified patent and that said Letters Patent is hereby corrected as shown below:

Title page,
Item [57], ABSTRACT, delete "A magnetic recording method using a magnetic head to record information in an information recording medium and read the information recorded on the information recording medium is such that the temperature of a portion of the information recording medium on of from which information is recorded or read is changed in order to record or read information.;"; and delete "; and"
and insert -- . Also included is --; and delete "on or from which information is recorded or read. The magnetic head is moved to the portion of the medium in which a temperature change is produced by the temperature changing mechanism, whereby information is recorded or read." and insert
-- near a selected position where information is to be recorded or read. Information is recorded by moving the magnetic head to the selected position of the medium and applying a magnetic field after the temperature of the portion of the medium near the selected position has been changed. --

Column 8,
Line 22, delete "temperate" and insert -- temperature --.

Signed and Sealed this

Third Day of June, 2003

JAMES E. ROGAN
*Director of the United States Patent and Trademark Office*